United States Patent [19]

Wheadon

[11] 4,327,163
[45] Apr. 27, 1982

[54] HALF-ENVELOPE SEPARATOR ASSEMBLIES ON INDIVIDUAL PLATES

[75] Inventor: Ellis G. Wheadon, Anderson, Ind.

[73] Assignee: General Motors Corporation, Detroit, Mich.

[21] Appl. No.: 206,712

[22] Filed: Nov. 14, 1980

[51] Int. Cl.³ .............................................. H01M 2/18
[52] U.S. Cl. .................................... 429/139; 429/246
[58] Field of Search ............... 429/130, 136, 137, 138, 429/139, 131, 246

[56] References Cited

U.S. PATENT DOCUMENTS 2,010,498  8/1935  Smith .................................. 429/136
3,514,331  5/1970  Cupp et al. ......................... 429/136

FOREIGN PATENT DOCUMENTS 266497  3/1927  United Kingdom ................ 429/136

Primary Examiner—Donald L. Walton
Attorney, Agent, or Firm—Lawrence B. Plant

[57] ABSTRACT

An electric storage battery having an electrochemically active cell element comprising juxtaposed positive and negative polarity electrode plates each at least partially encased in a sheath of microporous dendrite-suppressing battery separator material. Each of the sheaths is sealed along three of its peripheral borders and open on the fourth. The several plates are arranged in the cell element such that the opening in the sheaths for the positive plates face a direction opposite to the direction faced by the openings in the sheaths for the negative plates and such that the sheaths on adjacent plates overlap in the region between adjacent plates.

5 Claims, 6 Drawing Figures

HALF-ENVELOPE SEPARATOR ASSEMBLIES ON INDIVIDUAL PLATES

BACKGROUND OF THE INVENTION

This invention relates to electric storage batteries and more particularly to batteries wherein the electrochemically active cell elements have plates enveloped in a sheath of battery separator material. Battery separator materials are well known in the art, comprise a microporous membrane, and serve to electrically isolate the electrode and counterelectrode plates from each other. Separators generally have a high degree of porosity so as not to inhibit electrolyte circulation within the battery but very small pores for suppressing plate-shorting inter-electrode dendrite growth. Some manufacturers envelope the positive, negative or both plates in a sheath of the separator material. Separator-enveloped plates reduce the likelihood for dendrite-produced, inter-electrode shorting between the lateral and bottom edges of adjacent plates (i.e. edge-shorting) and improve the handling characteristics of the plates in the plant. The sheath typically comprises two sheets of separator material (e.g. sintered PVC) joined together along the bottom and side borders and open at the top. Usually a single strip is folded in half along the bottom, and the lateral borders of the sheets heat sealed to each other to form the sheath. The plate is positioned in the sheath such that the bottom edge of the plate lies in the fold of the strip and the heat sealed lateral borders of the sheath parallel the lateral edges of the plate it envelopes.

Batteries having separator sheathed plates open at the top suffer from two problems. First, dendrites tend to grow through the open tops of the sheaths until edge-shorting occurs between the top edges of adjacent plates. Secondly, the sheaths tend to trap electrolyte therein thereby reducing electrolyte mixing and mobility within the battery which in turn reduces the effective useful capacity and life of the battery.

It is an object of the present invention to provide an electric storage battery with separator-enveloped plates having improved electrolyte mobility and a reduced tendency for inter-electrode edge-shorting. This and other objects and advantages of the present invention will become more readily apparent from the detailed description thereof which follows.

BRIEF DESCRIPTION OF THE INVENTION

The present invention comprehends encapsulating each electrode and counter-electrode plate in a separator sheath sealed along three of its borders and open on the fourth. The sheathed plates of each cell element are then arranged such that the openings in the sheaths encasing the electrodes (i.e. electrode sheaths) face in one direction (e.g. left or down) and the openings in the sheaths encasing the counterelectrodes (i.e. counter-electrode sheaths) face in the opposite direction (e.g. right or up), and such that contiguous sheaths overlap in the region of the element between adjacent plates. By this arrangement, proximate edges of adjacent plates are always separated one from the other by at least one sealed separator border.

In a preferred embodiment, each sheath covers only slightly more than one half of its associated plate and the sheaths overlap only slightly near the centerline of the cell element. This results in only a single layer of separator material between the plates and hence reduced electrical resistance therebetween. It is to be recognized, however, that full electrode/counterelectrode sheaths could be used in batteries where double thickness separators can be tolerated (e.g. in cycling batteries).

Batteries made in accordance with the present invention may have the separator sheaths enclosing the top and bottom halves of adjacent plates or the lateral halves of the plates. Preferably the sheaths encase the lateral halves of the plates such that the openings of the sheaths overlap vertically near the centerline of the element. This arrangement seems to permit the best electrolyte mobility within the battery while still permitting gas to leave the sheath at the top thereof.

The invention will be better understood when considered in the light of the following detailed description of certain embodiments thereof made in conjunction with the attached drawings wherein.

Figure 1:
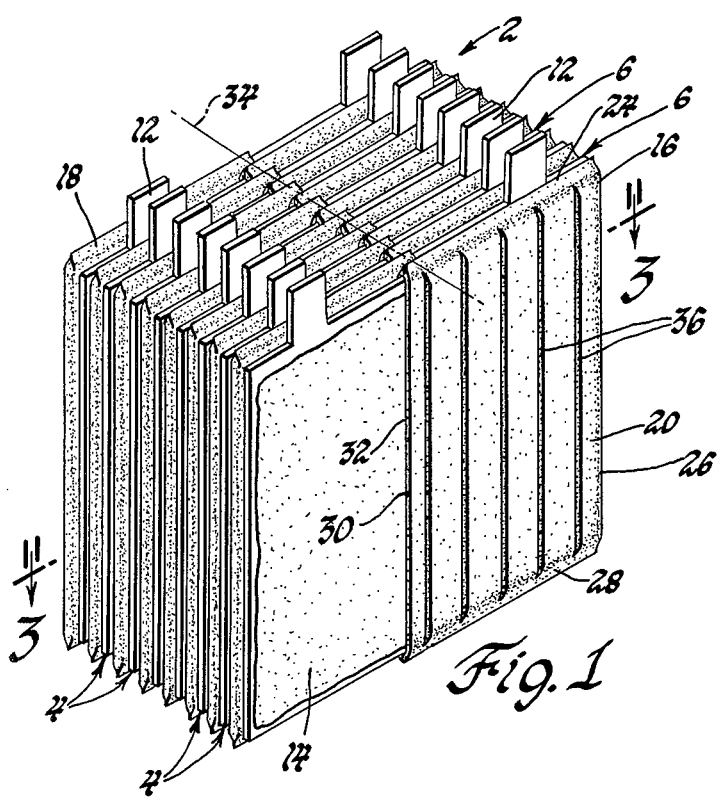
FIG. 1 shows a perspective view of a multi-plate cell element stack in accordance with the present invention.
Figure 2:
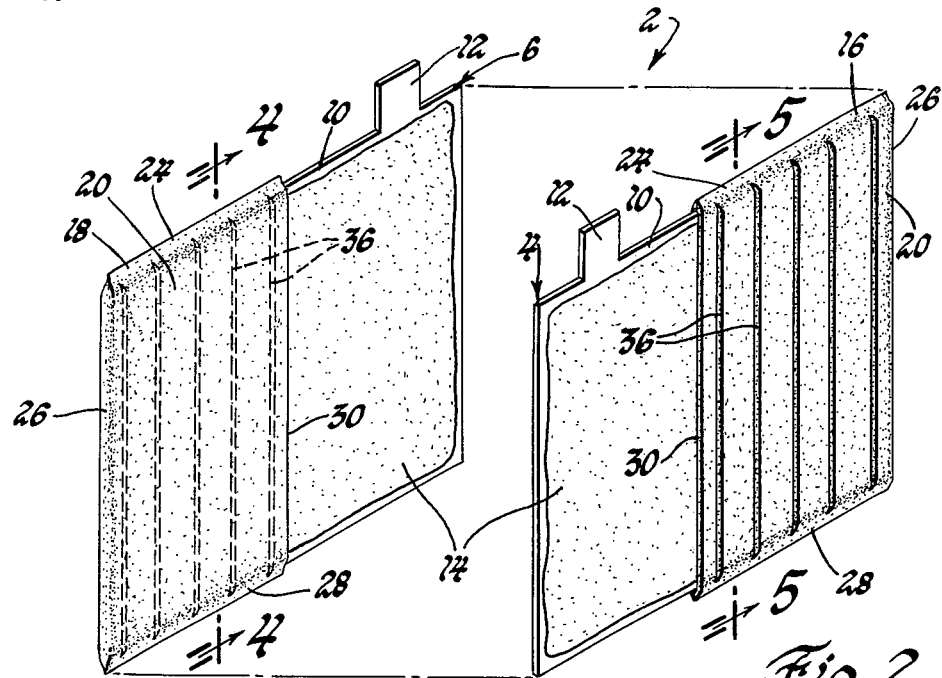
FIG. 2 is an exploded perspective view illustrating the preferred embodiment where the lateral halves of the plates are enveloped in separator sheaths.
Figure 3:
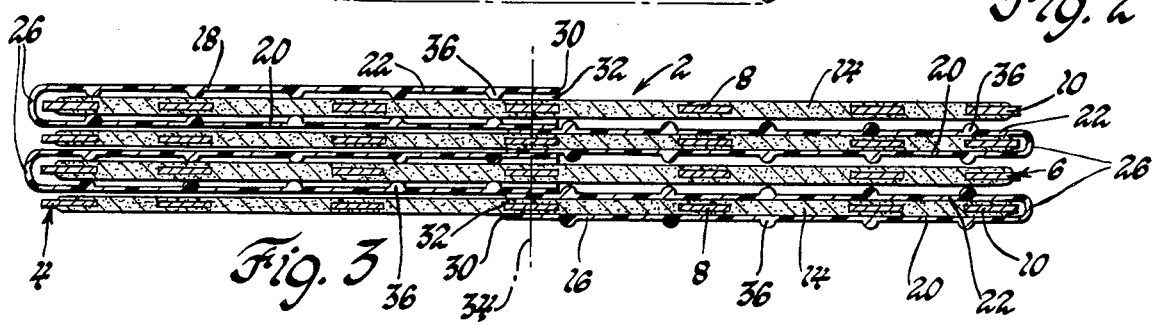
FIG. 3 is a sectioned view of some of the sheathed plates of the element of FIG. 1 taken in direction 3—3.
Figure 4:
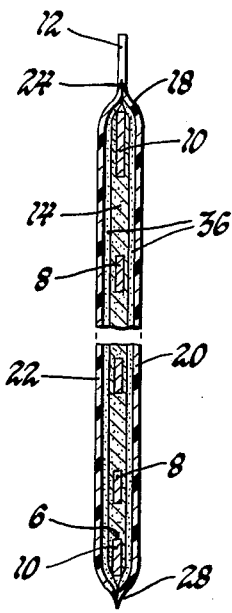
Figure 5:
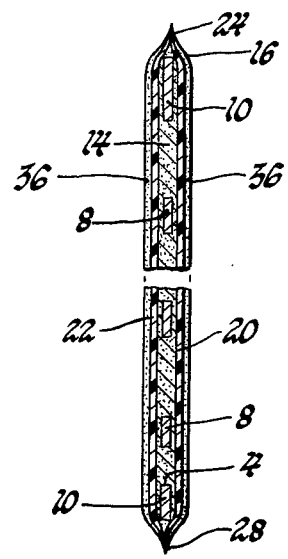

FIGS. 4 and 5 are sectioned views in the directions 4—4 and 5—5 of FIG. 2.

Figure 6:
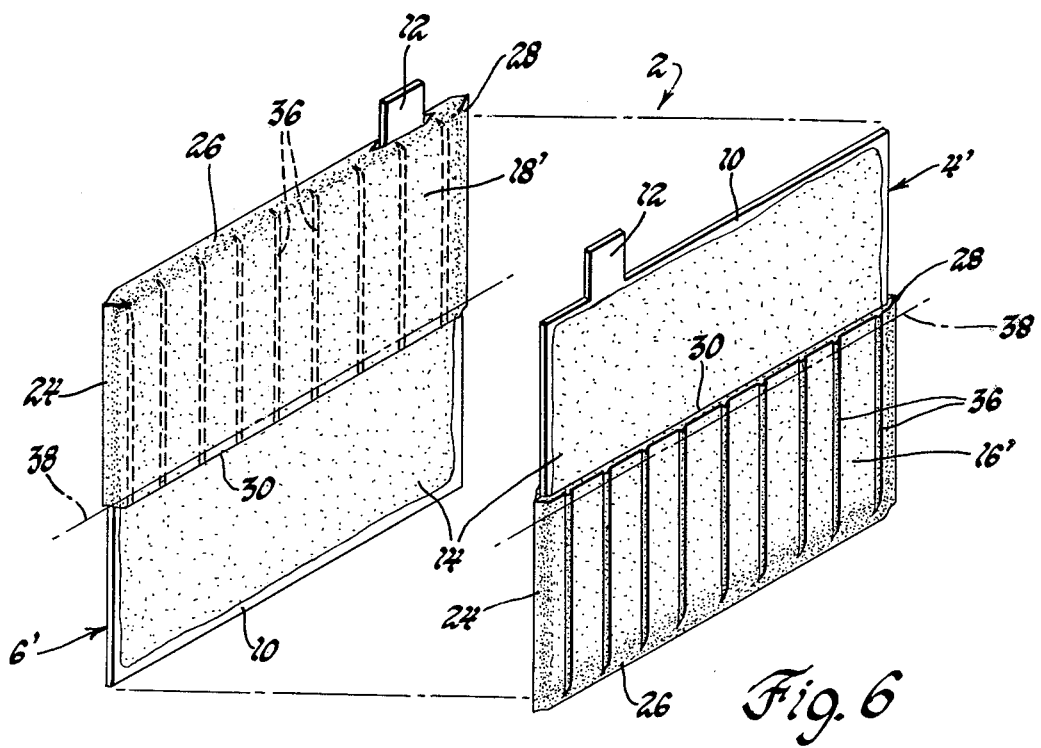

FIG. 6 is an exploded perspective view of another embodiment of the invention wherein the sheaths encase the upper and lower halves of the plates and the openings are horizontally disposed in the battery. Like numbers are used throughout the several figures to identify like parts.

The Figures illustrate a Pb-acid battery cell element 2 comprising a stack of electrode plates 4 (e.g. negative polarity) alternating with a plurality of counterelectrode plates 6 (e.g. positive polarity). The plates 4, 6 comprise a network of grid wires 8 extending across a supporting current-collecting peripheral frame 10. A plate lug 12 atop the frame 10 serves to join plates of like polarity together within the cell element 2, as is well known to those skilled in the art. The grid wire network is filled (i.e. pasted) with a leady active material 14 (i.e. typically lead oxide) as is likewise well known to those skilled in the art.

FIGS. 1-5 show the preferred embodiment wherein slightly more than one half of each of the plates 4, 6 is encased in a microporous sheath 16, 18 while the remaining half of the plates remain exposed. The sheaths 16, 18 themselves each comprise two sheets 20 and 22 defined by peripheral borders 24, 26, 28 and 30. Three of the borders 24, 26 and 28 of each sheet are joined (e.g. heat-sealed or folded) to like borders on the other sheet while the fourth borders 30 are left unjoined to provide an opening 32 through which the plates 4, 6 project; the battery electrolyte can move readily; and internally generated gases can escape freely. The border joints, like the separator itself, inhibits dendrite-growth therethrough. The plate sheaths 16, 18 overlap slightly at the vertical center 34 of the plates 4 and 6 (and hence element 2) to prevent any interplate dendrite growth through the openings 32. By this sheath arrangement there is no path by which dendrites can grow from one plate edge to the next without encountering at least one sealed separator border and no path by which dendrites can grow directly from plate-face to plate-face without encountering at least one sheet of separator.

Preferably a plate 4, 6 is encased in each sheath by simply folding an elongated strip of separator in half transverse the longitudinal axis, positioning the plate 4, 6 in the fold (i.e. border 26) and then heat-sealing the lateral borders 24, 28 together outboard the edges of the encased plate. Obviously two discrete separator sheets could be heat-sealed along three borders and the plate inserted thereafter.

The sheets 20, 22 forming the sidewalls of the sheaths 16, 18 preferably include a plurality of ribs 36 on the surface thereof to space the sheets 20, 22 away from the positive plate. Hence the counterelectrode sheath 18 destined to encase positive counterelectrode plate 6 will have its ribs 36 on the inside thereof and the electrode sheath 16 destined to encase the negative electrode plate 4 will have its ribs 36 on the outside surface thereof.

FIG. 6 illustrates another embodiment of the invention wherein the separator sheaths 16' and 18' encase the top and bottom halves of adjacent plates and overlap at the horizontal centerline 38 of the plates 4' and 6' as illustrated. This construction reduces dendrite edge-growth, but does not offer the same degree of electrolyte mobility or freedom for gas removal as does the preferred embodiment.

While this invention has been disclosed primarily in terms of specific embodiments thereof and exemplified solely in terms of a Pb-acid battery it is not intended to be limited thereto but rather only to the extent set forth hereafter in the claims which follow.

The embodiments of the invention in which an exclusive property or privilege is claimed are defined as follows:

1. An electric storage battery having an electrochemically active cell element comprising:
   an electrode plate having upper, lower and first and second lateral edges defining two opposing electrode faces;
   an electrode sheath encasing at least part of said electrode plate, said electrode sheath comprising two sheets of microporous dendrite-suppressing battery separator material, each of said sheets overlying one of said electrode faces and being defined at least in part by peripheral borders which extend beyond and substantially parallel to said edges, said borders of each of said sheets being joined to the borders of the other of said sheets outboard said edges such as to prevent dendrite growth thereat;
   a counterelectrode plate having upper, lower and first and second lateral edges defining two opposing counterelectrode faces;
   a counterelectrode sheath encasing at least part of said counterelectrode plate, said counterelectrode sheath comprising two sheets of microporous dendrite-suppressing battery separator material, each of said sheets overlying one of said counterelectrode faces and being defined at least in part by peripheral borders which extend beyond and substantially parallel to said edges, said borders of each of said sheets being joined to the borders of the other of said sheets outboard said edges such as to prevent dendrite growth thereat;
   an opening in each of said sheaths for ready ingress and egress of battery electrolyte to and from said sheaths during cycling; and
   said respectively sheathed electrode and counterelectrode being juxtaposed in face-to-face relation such that said opening in said electrode sheath faces a direction opposite to the direction faced by the opening in said counterelectrode sheath and the respective sheaths overlap each other in the region of said element lying between adjacent plates; whereby a continuous barrier of said separator material is provided between adjacent plates, at least one sheath border is interposed between all proximate edges of adjacent plates for reduced dendrite edge growth, and electrolyte mobility within the element is enhanced.

2. An electric storage battery having an electrochemically active cell element comprising:
   an electrode plate having upper, lower and first and second lateral edges defining two opposing electrode faces;
   an electrode sheath encasing slightly more than one half of said electrode plate, said electrode sheath comprising two sheets of microporous dendrite-suppressing battery separator material, each of said sheets overlying one of said electrode faces and being defined at least in part by peripheral borders which extend beyond and substantially parallel to said edges, said borders of each of said sheets being joined to the borders of the other of said sheets outboard said edges such as to prevent dendrite growth thereat;
   a counterelectrode plate having upper, lower and first and second lateral edges defining two opposing counterelectrode faces;
   a counterelectrode sheath encasing slightly more than one half of said counterelectrode plate, said counterelectrode sheath comprising two sheets of microporous dendrite-suppressing battery separator material, each of said sheets overlying one of said counterelectrode faces and being defined at least in part by peripheral borders which extend beyond and substantially parallel to said edges, said borders of each of said sheets being joined to the borders of the other of said sheets outboard said edges such as to prevent dendrite growth thereat;
   an opening in each of said sheaths for ready ingress and egress of battery electrolyte to and from said sheath during cycling; and
   said respectively sheathed electrode and counterelectrode being juxtaposed in face-to-face relation such that said opening in said electrode sheath faces a direction opposite to the direction faced by the opening in said counterelectrode sheath and the respective sheaths overlap each other between adjacent plates at substantially only the center of said element; whereby a continuous barrier of said separator material is provided between adjacent plates, at least one sheath border is interposed between all proximate edges of adjacent plates for reduced dendrite edge-growth, and electrolyte mobility within the element is enhanced.

3. An electric storage battery having an electrochemically active cell element comprising:
   an electrode plate having upper, lower and first and second lateral edges defining two opposing electrode faces;
   an electrode sheath encasing at least part of said electrode plate, said electrode sheath comprising two sheets of microporous dendrite-suppressing battery separator material, each of said sheets overlying one of said electrode faces and being defined at least in part by peripheral borders which extend beyond and substantially parallel to said edges, said borders of each of said sheets being joined to the borders of the other of said sheets outboard said upper, lower and one of said lateral edges such as to prevent dendrite growth thereat;

a counterelectrode plate having upper, lower and first and second lateral edges defining two opposing counterelectrode faces;

a counterelectrode sheath encasing at least part of said counterelectrode plate, said counterelectrode sheath comprising two sheets of microporous dendrite-suppressing battery separator material, each of said sheets overlying one of said counterelectrode faces and being defined at least in part by peripheral borders which extend beyond and substantially parallel to said edges, said borders of each of said sheets being joined to the borders of the other of said sheets outboard said upper, lower, and one of said lateral edges such as to prevent dendrite growth thereat;

an opening in each of said sheaths for ready ingress and egress of battery electrolyte to and from said sheath during cycling; and said respectively sheathed electrode and counterelectrode being juxtaposed in face-to-face relation such that said opening in said electrode sheath faces a direction opposite to the direction faced by the opening in said counterelectrode sheath and the respective sheaths overlap each other between adjacent plates; whereby a continuous barrier of said separator material is provided between adjacent plates, at least one sheath border is interposed between all proximate edges of adjacent plates for reduced dendrite edge growth, and electrolyte mobility within the element is enhanced.

4. An electric storage battery having an electrochemically active cell element comprising:

an electrode plate having upper, lower and first and second lateral edges defining two opposing electrode faces;

an electrode sheath encasing slightly more than one half of said electrode plate, said electrode sheath comprising two sheets of microporous dendrite-suppressing battery separator material, each of said sheets overlying one of said electrode faces and being defined at least in part by peripheral borders which extend beyond and substantially parallel to said edges, said borders of each of said sheets being joined to the borders of the other of said sheets outboard said upper, lower and one of said lateral edges such as to prevent dendrite growth thereat;

a counterelectrode plate having upper, lower and first and second lateral edges defining two opposing counterelectrode faces;

a counterelectrode sheath encasing slightly more than one half of said counterelectrode plate, said counterelectrode sheath comprising two sheets of microporous dendrite-suppressing battery separator material, each of said sheets overlying one of said counterelectrode faces and being defined at least in part by peripheral borders which extend beyond and substantially parallel to said edges, said borders of each of said sheets being joined to the borders of the other of said sheets outboard said upper, lower and one of said lateral edges such as to prevent dendrite growth thereat;

an opening in each of said sheaths for ready ingress and egress of battery electrolyte to and from said sheath during cycling; and said respectively sheathed electrode and counterelectrode being juxtaposed in face-to-face relation such that said opening in said electrode sheath faces a direction opposite to the direction faced by the opening in said counterelectrode sheath and the respective sheaths overlap each other between adjacent plates at substantially only the vertical center of said element; whereby a continuous barrier of said separator material is provided between adjacent plates, at least one sheath border is interposed between all proximate edges of adjacent plates for reduced dendrite edge growth, and electrolyte mobility within the element is enhanced.

5. An electric storage battery having an electrochemically active cell element comprising:

an electrode plate having upper, lower and first and second lateral edges defining two opposing electrode faces;

an electrode sheath encasing slightly more than one half said electrode plate, said electrode sheath comprising two sheets of microporous dendrite-suppressing battery separator material, each of said sheets overlying one of said electrode faces and being defined at least in part by peripheral borders which extend beyond and substantially parallel to said edges, said borders of each of said sheets being joined to the borders of the other of said sheets outboard said edges such as to prevent dendrite growth thereat, said borders outboard said upper and lower edges being fused together and said border outboard any one of said lateral edges being a fold at the junction of said sheets;

a counterelectrode plate having upper, lower and first and second lateral edges defining two opposing counterelectrode faces;

a counterelectrode sheath encasing slightly more than one half of said counterelectrode plate, said counterelectrode sheath comprising two sheets of microporous dendrite-suppressing battery separator material, each of said sheets overlying one of said counterelectrode faces and being defined at least in part by peripheral borders which extend beyond and substantially parallel to said edges, said borders of each of said sheets being joined to the borders of the other of said sheets outboard said edges such as to prevent dendrite growth thereat, said borders outboard said upper and lower edges being fused together and said border outboard one of said lateral edges being a fold at the junction of said sheets;

an opening in each of said sheaths for ready ingress and egress of battery electrolyte to and from said sheath during cycling; and said respectively sheathed electrode and counterelectrode being juxtaposed in face-to-face relation such that said opening in said electrode sheath faces a direction opposite to the direction faced by the opening in said counterelectrode sheath and the respective sheaths overlap each other between adjacent plates at substantially only the vertical center of said element; whereby a continuous barrier of said separator material is provided between adjacent plates, at least one sheath border is interposed between all proximate edges of adjacent plates for reduced dendrite edge growth and electrolyte mobility within the element is enhanced.

* * * * *